United States Patent
Ishii et al.

(10) Patent No.: US 7,852,410 B2
(45) Date of Patent: Dec. 14, 2010

(54) IMAGE SUPERIMPOSING APPARATUS

(75) Inventors: Tooru Ishii, Tokyo (JP); Atsushi Tanaka, Tokyo (JP); Yasunori Tsubaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1213 days.

(21) Appl. No.: 11/455,175

(22) Filed: Jun. 19, 2006

(65) Prior Publication Data

US 2007/0171286 A1 Jul. 26, 2007

(30) Foreign Application Priority Data

Jan. 20, 2006 (JP) .............................. 2006-012938

(51) Int. Cl.
*H04N 9/74* (2006.01)
(52) U.S. Cl. ...................................... 348/586; 348/589
(58) Field of Classification Search ......... 348/584–601; 345/629–641
See application file for complete search history.

(56) References Cited

U.S. PATENT DOCUMENTS 5,999,160 A * 12/1999 Kitamura et al. ............ 715/202
6,380,948 B1 * 4/2002 Murayama et al. .......... 345/660

FOREIGN PATENT DOCUMENTS

| JP | 6-105228 A | 4/1994 |
| JP | 7-30812 A | 1/1995 |
| JP | 2003-78818 A | 3/2003 |
| JP | 2004-274125 A | 9/2004 |

* cited by examiner

*Primary Examiner*—M. Lee
(74) *Attorney, Agent, or Firm*—Birch, Stewart, Kolasch & Birch, LLP (57) ABSTRACT

A deepest part searching means divides each frame of a background image into a plurality of blocks, and searches for a candidate for the deepest part of the background image which is located the deepest in a direction of the depth of the background image, a deepest part determining means selects one of the searched candidate for the deepest part of the background image and predetermined candidates for the deepest part of the background image so as to determine the deepest part of the background image, a superimposing determining means determines a superimposing method of superimposing each of the series of images to be superimposed on the background image, and a superimposing processing means superimposes the series of images to be superimposed on the background image on a frame-by-frame basis according to the determined superimposing method.

18 Claims, 6 Drawing Sheets

| Season (Months) | Candidate for the deepest part from the deepest part searching means 14 | Candidates for the deepest part predetermined by the deepest part determining means 15 |
|---|---|---|
| Spring (March to May) | 50% | 50% (※) |
| Summer (June to August) | 90% | 10% (※) |
| Autumn (September to November) | 50% | 50% (※) |
| Winter (December to February) | 30% | 70% (※) |

※In a case where each frame is divided into 9 blocks

| | |
|---|---|
| Central block | 50% |
| Upper central block | 20% |
| Lower central block | 15% |
| Upper left block | 10% |
| Upper right block | 5% |

IMAGE SUPERIMPOSING APPARATUS

BACKGROUND OF THE INVENTION

1. Field of the Invention

The present invention relates to an image superimposing apparatus for superimposing an image to be superimposed (e.g., image or video information, such as a character string or figure for explanation) upon a background image.

2. Description of Related Art

For example, patent reference 1 discloses, as a related art image superimposing apparatus, a telop apparatus including a photographic object shooting camera for shooting a photographic object, an object position detecting means for detecting the position of the photographic object, a telop display means for displaying a telop in a shot image according to movements of the photographic object detected by the object position detecting means, and a combining means for combining output information from the telop display means and the image of the above-mentioned photographic object.

[Patent reference 1] JP,2003-78818,A (see paragraph 0006)

A problem with the related art image superimposing apparatus constructed as mentioned above is that although an image currently displayed and superimposed on a background image can be made to run only in parallel with a vertical or horizontal direction on the screen, the superimposed image cannot be made to run in a direction of the depth of the background image.

SUMMARY OF THE INVENTION

The present invention is proposed in order to solve the above-mentioned problem, and it is therefore an object of the present invention to provide an image superimposing apparatus which can make an image superimposed on a background image run in a direction of the depth of the background image.

In accordance with the present invention, there is provided an image superimposing apparatus including: an image-to-be-superimposed input means for inputting an image to be superimposed; a background image input means for inputting a background image which is used as a background against which the image to be superimposed is to be displayed; a display form input means (or a parameter input means) for inputting a display form of the image to be superimposed; a display start position setting means (or a deepest part searching means and a deepest part determining means) for setting a display start position at which a display of the image to be superimposed on the background image is started; and a superimposing processing means for acquiring the image to be superimposed inputted by the superimposing image input means, the background image inputted by the background image input means, and the display form inputted by the display form input means, and for starting a display of the image to be superimposed from the display start position set by the display start position setting means.

The present invention offers an advantage of being able to display a flow of the image to be superimposed in a direction of the depth of the background image.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the present invention will be now described with reference to the accompanying drawings. In the following description of the preferred embodiments, like reference numerals refer to like elements in the various views.

Embodiment 1

Figure 1:
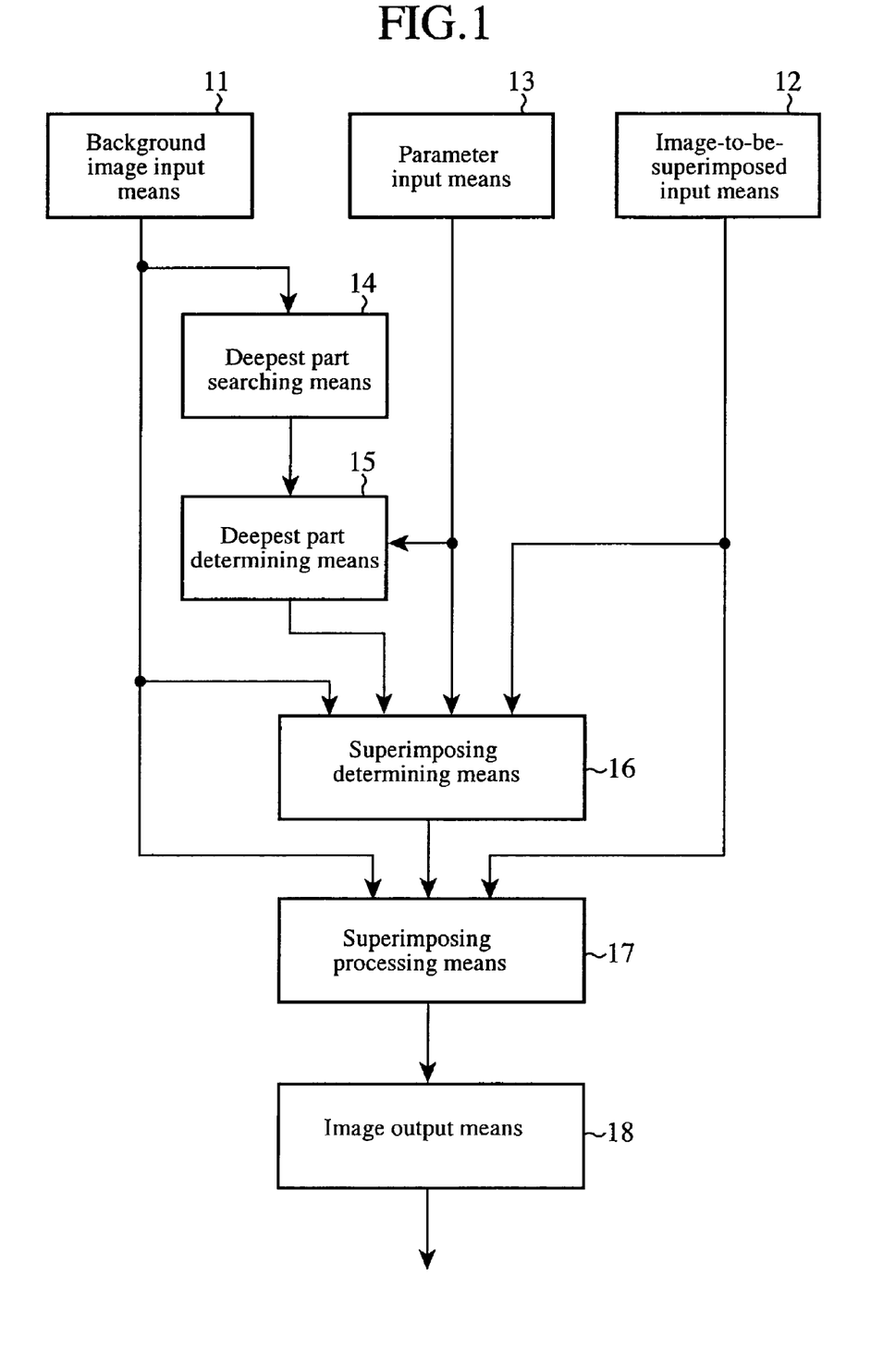
FIG. 1 is a block diagram showing the structure of an image superimposing apparatus in accordance with embodiment 1 of the present invention.

FIG. 1 is a block diagram showing the structure of an image superimposing apparatus in accordance with embodiment 1 of the present invention. This image superimposing apparatus is provided with a background image input means 11, an image-to-be-superimposed input means 12, a parameter input means (i.e., a display form input means) 13, a deepest part searching means (i.e., a display start position setting means) 14, a deepest part determining means (i.e., the display start position setting means) 15, a superimposing determining means 16, a superimposing processing means 17, and an image output means 18. When superimposing and displaying an image to be superimposed on a background image, the image superimposing apparatus starts a display of the image to be superimposed from the deepest part of the background image, and makes the image to be superimposed which is being displayed run in a direction of the depth of the background image, i.e., move from the back of the background image toward the front of the background image.

In FIG. 1, the background image input means 11 can input a background image which is used as the background of an image to be superimposed, such as a moving image or still image, and the superimposing image input means 12 can input a series of images to be superimposed each of which is image or video information, such as a character string or figure for explanation.

For each of the series of images to be superimposed which is to be displayed on each frame of the background image inputted by the background image input means 11, the parameter input means 13 inputs display information required for a display of each of the series of images to be superimposed, such as position information for specifying a display position where each image to be superimposed is to be displayed with coordinates, size information for specifying the size of each image to be superimposed, inclination information for specifying the inclination of each image to be superimposed, color information for specifying the color of each image to be superimposed, focus information for specifying how each image to be superimposed gets blurred (i.e., the blur level of each image to be superimposed), and transparency information for specifying the transparency of each image to be superimposed, according to specifications made by the user, the display information being dependent upon for which time each of the series of images to be superimposed is to be displayed. The parameter input means 13 also inputs viewer position information from a sensor (not shown) for detecting the position of a viewer who is viewing and listening to the series of images to be superimposed which are sequentially superimposed on the background image with respect to the display screen of the image superimposing apparatus.

The deepest part searching means 14 divides each frame of the background image inputted by the background image input means 11 into a plurality of blocks, and searches through the plurality of blocks for a candidate for the deepest part of the background image in the direction of the depth of the background image based on a color distribution or brightness of each of the plurality of blocks. The deepest part determining means 15 then selects one of the candidate for the deepest part of the background image which is searched by the deepest part searching means 14, and predetermined candidates for the deepest part of the background image, according to a probability preset to the candidate for the deepest part of the background image which is searched by the deepest part searching means 14, and probabilities respectively preset to the predetermined candidates for the deepest part of the background image, those probabilities being predetermined dependently upon the contents of the background image, such as a season in which the background image was created, so as to determine the deepest part of the background image.

The superimposing determining means 16 acquires the background image inputted by the background image input means 11, the series of images to be superimposed inputted by the superimposing image input means 12, the display information required for a display of each of the series of images to be superimposed, such as position information, size information, inclination information, color information, focus information, and transparency information, which is inputted by the parameter input means 13, the display information being dependent upon for which time each of the series of images to be superimposed is to be displayed, and the information about the deepest part of the background image determined by the deepest part determining means 15, and determines a superimposing method of superimposing each of the series of images to be superimposed on the background image at which position of the background image, in what size, in what inclination, in what color, in what blur level, and in what transparency, the superimposing method being dependent upon for which time each of the series of images to be superimposed is to be displayed.

The superimposing processing means 17 acquires the background image inputted by the background image input means 11, and the series of images to be superimposed inputted by the superimposing image input means 12, and sequentially superimposes the series of images to be superimposed on the background image on a frame-by-frame basis according to the superimposing method of superimposing each of the series of images to be superimposed on the background image, which is determined by the superimposing determining means 16, the superimposing method being dependent upon for which time each of the series of images to be superimposed is to be displayed. The image output means 18 outputs an image in which the series of images to be superimposed are sequentially superimposed on the background image by the superimposing processing means 17 on a frame-by-frame basis.

Figure 2:
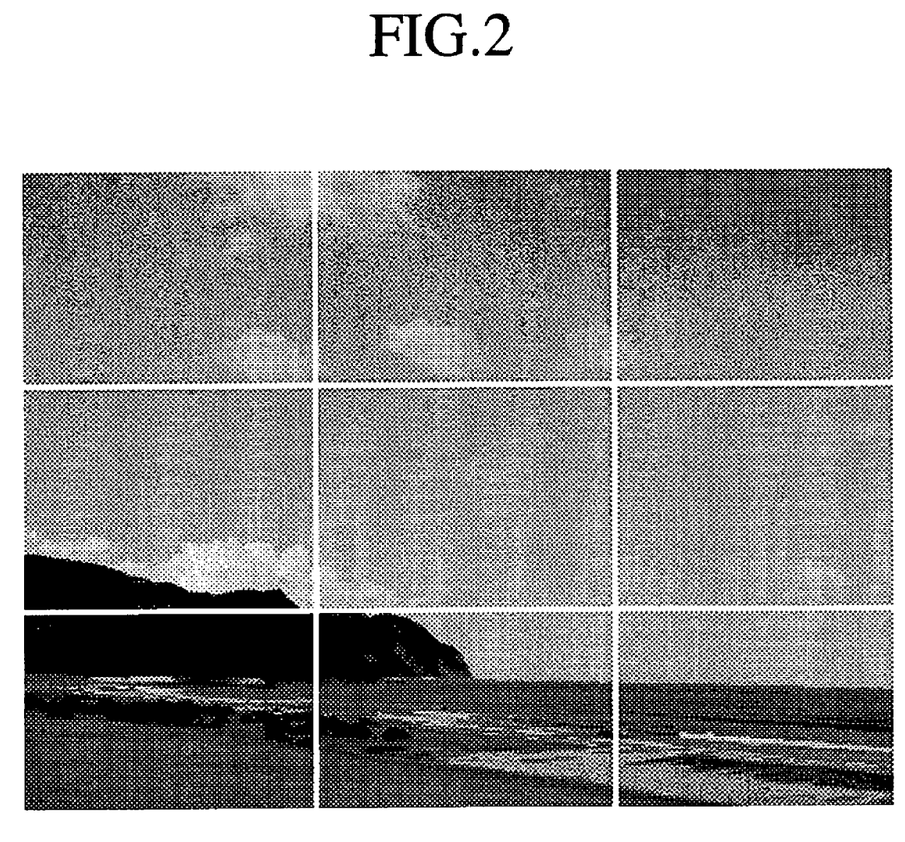
FIG. 2 is a diagram showing an example in which each frame of a background image is divided into nine blocks by a deepest part searching means of the image superimposing apparatus in accordance with embodiment 1 of the present invention.
Figure 3:
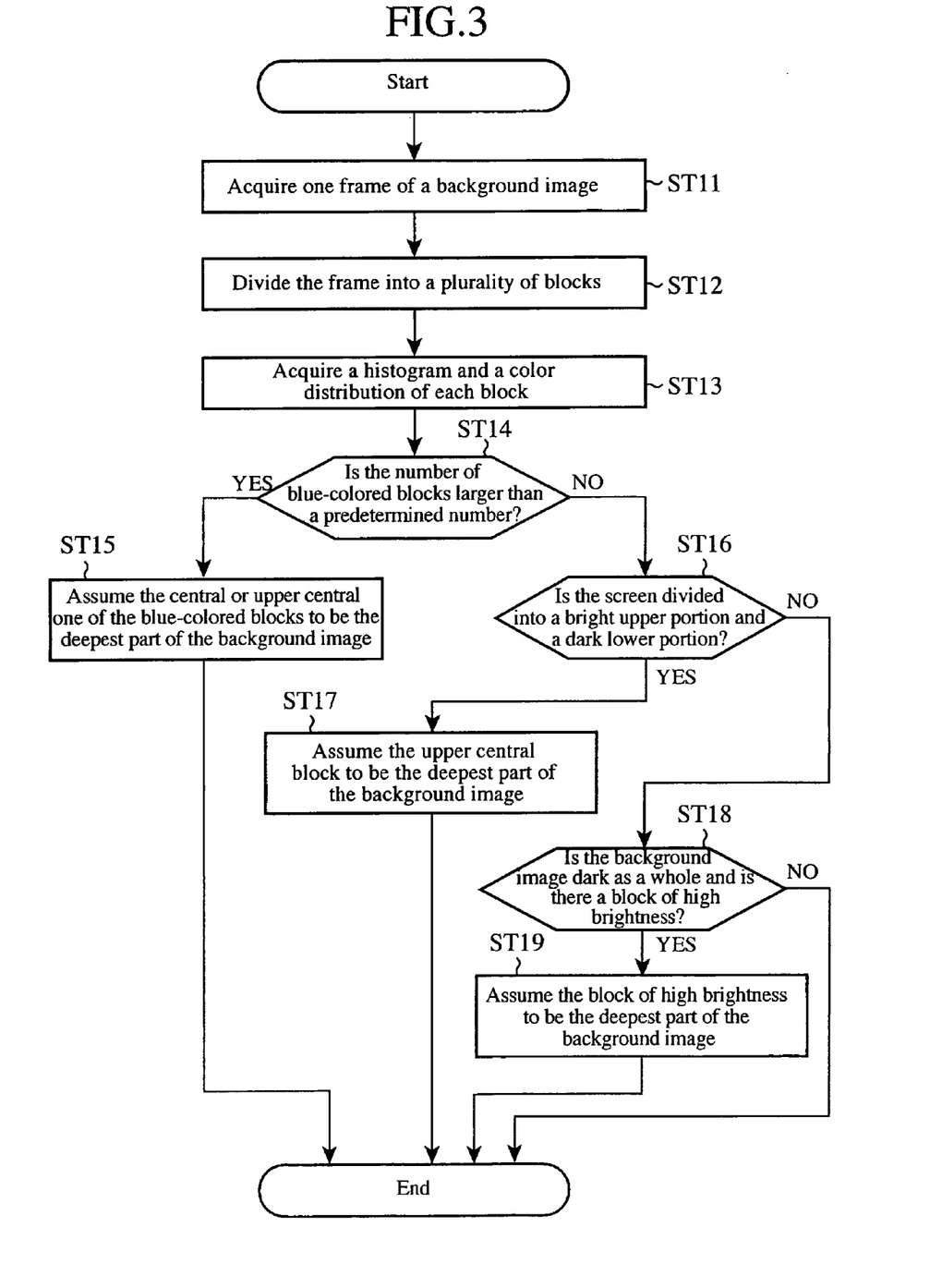
FIG. 3 is a flowchart showing a flow of processing carried out by the deepest part searching means of the image superimposing apparatus in accordance with embodiment 1 of the present invention.

Next, processing carried out by each of the above-mentioned means will be explained in detail. FIG. 2 is a diagram showing an example in which each frame of the background image is divided into nine blocks by the deepest part searching means 14. FIG. 3 is a flow chart showing a flow of processing carried out by the deepest part search means 14. In step ST11 of FIG. 3, the deepest part searching means 14 acquires one frame of the background image, and, in step ST12, acquires the format of the background image and divides the frame into a plurality of blocks, for example, nine blocks as shown in FIG. 2 based on information about a horizontal resolution and a vertical resolution which is contained in the format.

In step ST13, the deepest part searching means 14 acquires a histogram and a color distribution of each of the plurality of divided blocks. The histogram is a graphic presentation in which the values of the brightness are shown on the horizontal axis and the number of pixels in each brightness value are shown on the vertical axis, and shows the tendency of the brightness of each of the plurality of blocks. In step ST14, the deepest part searching means 14 checks the color distribution of each of the plurality of blocks, which is acquired in above-mentioned step ST13, so as to determine whether or not the number of blue-colored blocks is equal to or larger than a predetermined number in each frame. For example, in the case of FIG. 2, the deepest part searching means 14 determines whether the number of blue-colored blocks is equal to or larger than the predetermined number which is 5.

When, in above-mentioned step ST14, determining that the number of blue-colored blocks is equal to or larger than the predetermined number, the deepest part searching means 14, in step ST15, determines that the background image contains an image of the sky, and outputs, as the candidate for the deepest part of the background image, a central or upper central one of the blue-colored blocks. The deepest part search means 14 then ends the processing.

On the other hand, when, in above-mentioned step ST14, determining that the number of blue-colored blocks is not equal to or larger than the predetermined number, the deepest part searching means 14, in step ST16, checks the brightness of each of the plurality of blocks from the histogram of each of the plurality of blocks, which is acquired in above-mentioned step ST13, so as to determine whether or not the background image is divided into a bright upper portion and a dark lower portion. When, in above-mentioned step ST16, determining that the background image is divided into a bright upper portion and a dark lower portion, the deepest part searching means 14, in step ST17, outputs, as the candidate for the deepest part of the background image, an upper central one of the plurality of blocks, and then ends the processing.

On the other hand, when, in above-mentioned step ST16, determining that the background image is not divided into a bright upper portion and a dark lower portion, the deepest part searching means 14, in step ST18, checks the brightness of each of the plurality of blocks from the histogram of each of the plurality of blocks, which is acquired in above-mentioned step ST13, so as to determine whether or not the background image is a dark one as a whole and a block of high brightness exists in the whole dark image. When determining that the background image is a dark one as a whole and a block of high brightness exists in the whole dark image, the deepest part searching means 14, in step ST19, outputs, as the candidate for the deepest part of the background image, the block of high brightness, and then ends the processing. On the other hand, when, in above-mentioned step ST18, determining that the background image is not a dark one as a whole, or although the background image is a dark one as a whole, no block of high brightness exists in the whole dark image, the deepest part searching means 14 determines that it cannot specify the candidate for the deepest part from the acquired background image, and then ends the processing.

Figure 4:
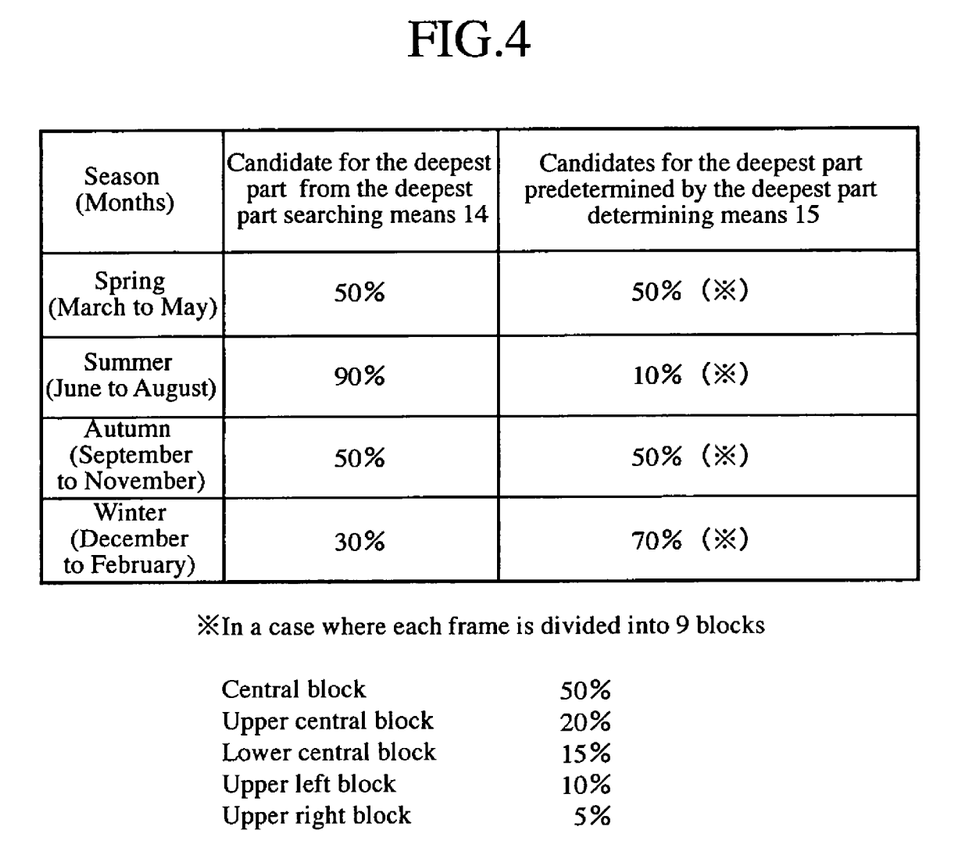
FIG. 4 is a diagram for explaining an example in which a deepest part determining means selects one of a searched candidate for the deepest part of the background image, and predetermined candidates for the deepest part of the background image, according to probabilities respectively preset to them, those probabilities being predetermined dependently upon the season in which the background image was created, so as to determine the deepest part of the background image.

FIG. 4 is a diagram for explaining an example in which the deepest part determining means 15 selects one of the candidate for the deepest part of the background image which is searched by the deepest part searching means 14, and the predetermined candidates for the deepest part of the background image, according to a probability preset to the searched candidate for the deepest part of the background image, and probabilities respectively preset to the predetermined candidates for the deepest part of the background image, those probabilities being predetermined dependently upon the season in which the background image was created, and which is a predetermined parameter indicating the contents of the background image, so as to determine the deepest part of the background image. This example of FIG. 4 shows that in order for the deepest part determining means 15 to select, as the deepest part of the background image, one of the candidate for the deepest part of the background image which is searched by the deepest part searching means 14, and the candidates for the deepest part of the background image which are predetermined therein according to the season in which the background image was created, what probability is preset to the searched candidate for the deepest part of the background image and what probability is preset to each of the predetermined candidates for the deepest part of the background image as the contents of the background image change.

For example, in summer, there are many cases where contents, such as a scenery photograph in which the sky was photo-shot, are used as the background image, and therefore there is a high probability that the deepest part which is searched by the deepest part search means 14 is truly the deepest part of the background image. Therefore, as the contents of the background image change, the deepest part determining means 15 selects, as the deepest part of the background image, one of the candidate for the deepest part of the background image which is searched by the deepest part searching means 14, and the candidates for the deepest part of the background image which are predetermined therein according to a probability of 90% preset to the searched candidate for the deepest part of the background image and a remaining probability of 10% preset to the predetermined candidates for the deepest part of the background image.

On the other hand, in winter, there are rare cases where contents, such as a scenery photograph in which the sky was photo-shot, are used as the background image, and therefore there is a low probability that the deepest part which is searched by the deepest part search means 14 is truly the deepest part of the background image. Therefore, as the contents of the background image change, the deepest part determining means 15 selects, as the deepest part of the background image, one of the candidate for the deepest part of the background image which is searched by the deepest part searching means 14, and the candidates for the deepest part of the background image which are predetermined therein according to a probability of 30% preset to the searched candidate for the deepest part of the background image and a remaining probability of 70% preset to the predetermined candidates for the deepest part of the background image.

In spring or autumn, it is expected that although contents, such as a scenery photograph in which the sky was photo-shot, may be used as the background image, the contents have a nature intermediate between those in summer and those in winter. Therefore, the deepest part determining means 15 selects, as the deepest part of the background image, one of the candidate for the deepest part of the background image which is searched by the deepest part searching means 14, and the candidates for the deepest part of the background image which are predetermined therein according to a probability of 50% preset to the searched candidate for the deepest part of the background image and a remaining probability of 50% preset to the predetermined candidates for the deepest part of the background image.

For example, when each frame is divided into nine blocks, as shown in FIG. 2, a central block, an upper central block, a lower central block, an upper left block, and an upper right block are defined in advance as the predetermined candidates for the deepest part by the deepest part determining means 15. In each season, in order to finally select one of the candidates for the deepest part defined in advance by the deepest part determining means 15 as the deepest part of the background image, probabilities are preset to the predetermined candidates for the deepest part, respectively. In the example of FIG. 4, a probability of 50% is preset to the central block, a probability of 20% is preset to the upper central block, a probability of 15% is preset to the lower central block, a probability of 10% is preset to the upper left block, and a probability of 5% is preset to the upper right block.

Thus, the deepest part determining means 15 can exactly determine the deepest part of the background image which varies dependently upon the contents of the background image by selecting one of the candidate for the deepest part of the background image which is searched by the deepest part searching means 14, and the predetermined candidates for the deepest part of the background image which are defined in advance therein according to the probabilities which are defined in advance dependently upon the season in which the background image was created. In the example shown in FIG. 4, the season in which the background image was created is determined on a "month-by-month" basis, and the deepest part determining means 15 determines the season in which the background image was created by determining in which season the date on which the background image was created is contained using a timer (not shown) disposed therein.

In the example of FIG. 4, the deepest part determining means 15 determines the deepest part of the background image by selecting one of the searched candidate for the deepest part of the background image and the predetermined candidates for the deepest part of the background image according to the probabilities which are defined in advance dependently upon the season in which the background image was created. As an alternative, the deepest part determining means 15 can determine the deepest part of the background image by selecting one of the candidate for the deepest part of the background image which is searched by the deepest part searching means 14, and the predetermined candidates for the deepest part of the background image which are defined in advance therein according to the probabilities which are defined in advance dependently upon the type of fashion of the contents of the background image. In this variant, the user is allowed to specify the type of fashion of the contents of the background image by way of the parameter input means 13.

The superimposing determining means 16 then acquires the display information required for a display of each of the series of images to be superimposed, such as position information, size information, inclination information, color information, focus information, and transparency information, from the parameter input means 13, the display information being dependent upon for which time each of the series of images to be superimposed is to be displayed. The superimposing determining means 16 then acquires the first frame of the background image from the background image input means 11, acquires an image to be superimposed which is to be displayed in the first frame from the image-to-be-superimposed input means 12, and acquires the information about the deepest part of the first frame of the background image which is determined by the deepest part determining means 15.

The superimposing determining means 16 defines the deepest part of the first frame of the background image, which it has acquired from the deepest part determining means 15, as a display start position at which a display of the image to be superimposed in the first frame is started, checks the color distribution of the deepest part of the first frame of the background image, and the size of the image to be superimposed which is to be superimposed on the first frame of the background image, and determines the size, inclination, color, blur level, and transparency of the display of the image to be superimposed which is actually displayed in the first frame by taking into consideration the size information, inclination information, color information, focus information, and transparency information about the image to be superimposed which is to be displayed for the first time from the parameter input means 13, and the checked color distribution of the deepest part of the first frame of the background image.

At this time, when the color distribution of the deepest part of the first frame of the background image exhibits the same color as that indicated by the color information from the parameter input means 13, the superimposing determining means 16 determines, as the color of the image to be superimposed which is to be displayed in the first frame, not the color specified by the parameter input means 13, but a color which is not the same as the color distribution of the deepest part of the first frame of the background image, e.g., a color which is complement to the color distribution of the deepest part of the first frame of the background image so that the image to be superimposed can be easily recognized when superimposed on the first frame of the background image. When determining both the size and inclination of the display of the image to be superimposed which is to be displayed in the first frame, the superimposing determining means 16 does not determine, as the size and inclination of the display of the image to be superimposed which is to be displayed in the first frame, the size and inclination of the display specified by the parameter input means 13, just as they are. Instead, the superimposing determining means 16 determines the size and inclination of the display of the image to be superimposed which is to be displayed in the first frame in consideration of the display area of the display screen. The superimposing determining means 16 then notifies the superimposing method of superimposing the image to be superimposed on the first frame of the background image, which is determined as mentioned above, to the superimposing processing means 17.

The superimposing processing means 17 acquires the first frame of the background image from the background image input means 11, acquires the first frame of the image to be superimposed from the superimposing image input means 12, transforms the first frame of the image to be superimposed so that it has, in display, a size, an inclination, a color, a blur level, and a transparency which are specified according to the superimposing method of superimposing the image to be superimposed on the first frame of the background image, which is notified thereto by the superimposing determining means 16, and superimposes the transformed image to be superimposed on the block which is determined to be the deepest part of the first frame of the background image.

Figure 5:
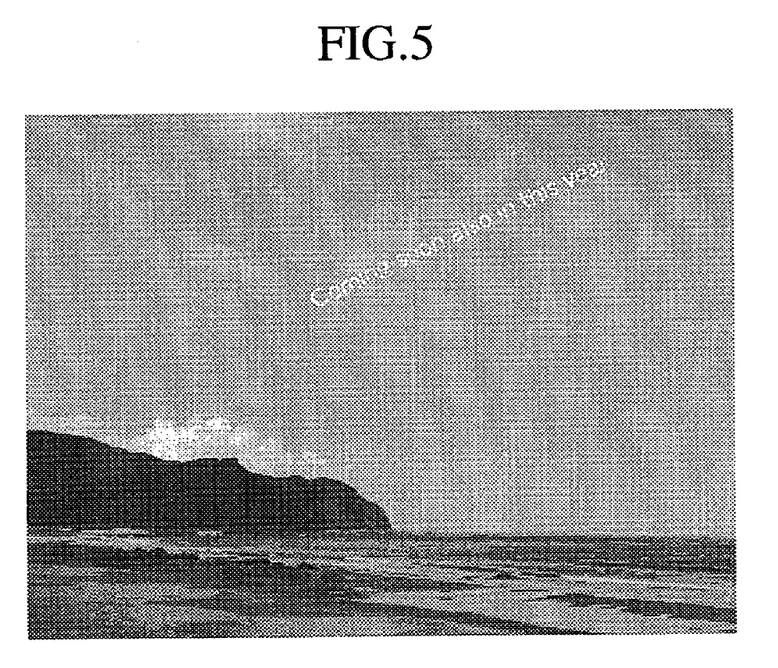
FIG. 5 is a diagram showing an example of the first frame of an image outputted by an image output means of the image superimposing apparatus in accordance with embodiment 1 of the present invention.

Then the image output means 18 outputs the first frame of the image in which the image to be superimposed is superimposed on the background image by the superimposing processing means 17. FIG. 5 is a diagram showing an example of the image of the first frame outputted by the image output means 18. In this example, the image to be superimposed of "Coming soon also in this year" is displayed in the upper central block which is determined to be the deepest part of the first frame of the background image which is a scenery photograph including the photo-shot sky and sea in a certain size, a certain inclination, a certain color, a certain blur level, and a certain transparency, which are determined by the superimposing determining means 16.

The superimposing determining means 16 then acquires a second frame of the background image from the background image input means 11, acquires an image to be superimposed which is to be newly and additionally displayed in the second frame from the image-to-be-superimposed input means 12, and acquires information about the deepest part of the second frame of the background image which is determined by the deepest part determining means 15.

The superimposing determining means 16 then defines the deepest part of the second frame of the background image, which it has acquired from the deepest part determining means 15, as a display start position at which a newly and additionally display of the second image to be superimposed in the second frame is started, checks the color distribution of the deepest part of the second frame of the background image, and the size of the second image to be superimposed which is to be newly and additionally displayed in the second frame of the background image, and determines the size, inclination, color, blur level, and transparency of the second image to be superimposed which is to be newly and additionally displayed in the second frame of the background image by taking into consideration the size information, inclination information, color information, focus information, and transparency information about an image to be superimposed which is to be displayed for the first time in the background image from the parameter input means 13, the checked color distribution of the deepest part of the second frame of the background image, and the checked size of the second image to be superimposed which is to be newly and additionally displayed in the second frame of the background image, as in the case of the superimposing of an image to be superimposed on the first frame of the background image.

For the first image to be superimposed which has been displayed in the first frame and is to be displayed for a second time in the background image, the superimposing determining means 16 determines a display position at which the first image to be superimposed which is to be displayed for the second time is to be displayed in the background image based on position information about the second display from the parameter input means 13, checks a color distribution at the display position of the first image to be superimposed which is to be displayed for the second time in the second frame of the background image, and the size of the first image to be superimposed which is to be displayed for the second time in the second frame of the background image, and determines the size, inclination, color, blur level, and transparency of the display of the first image to be superimposed which is to be displayed for the second time in the second frame of the background image by taking into consideration the size information, inclination information, color information, focus information, and transparency information about an image to be superimposed which is to be displayed for a second time in the background image from the parameter input means 13, the checked color distribution at the display position of the first image to be superimposed which is to be displayed for the second time in the second frame of the background image, and the checked size of the first image to be superimposed which is to be displayed for the second time in the background image, as in the case of the superimposing of an image to be superimposed on the first frame of the background image. At this time, the superimposing determining means 16 determines the size of the first image to be superimposed which is to be displayed for the second time in the background image so that it has a larger size than when was displayed for the first time in the background image. The superimposing determining means 16 then notifies the superimposing method of superimposing each of the first and second images to be superimposed on the second frame of the background image, which is determined as mentioned above, to the superimposing processing means 17.

Thus, the superimposing processing means 17 acquires the second frame of the background image from the background image input means 11, acquires an image to be superimposed which is to be newly and additionally displayed in the second frame of the background image from the superimposing image input means 12, transforms the newly-added image to be superimposed which is to be displayed for the first time in the background image and the first image to be superimposed which is to be displayed for a second time in the background image so that each of them has, in display, a certain size, a certain inclination, a certain color, a certain blur level, and a certain transparency which are determined by the superimposing determining means 16 according to the superimposing method of superimposing each of the images to be superimposed on the second frame of the background image, which is notified thereto by the superimposing determining means 16, and superimposes the transformed second image to be superimposed which is to be displayed for the first time on the block which is determined to be the deepest part of the second frame of the background image and also superimposes the transformed first image to be superimposed which is to be displayed for the second time on the specified display position of the second frame of the background image.

Figure 6:
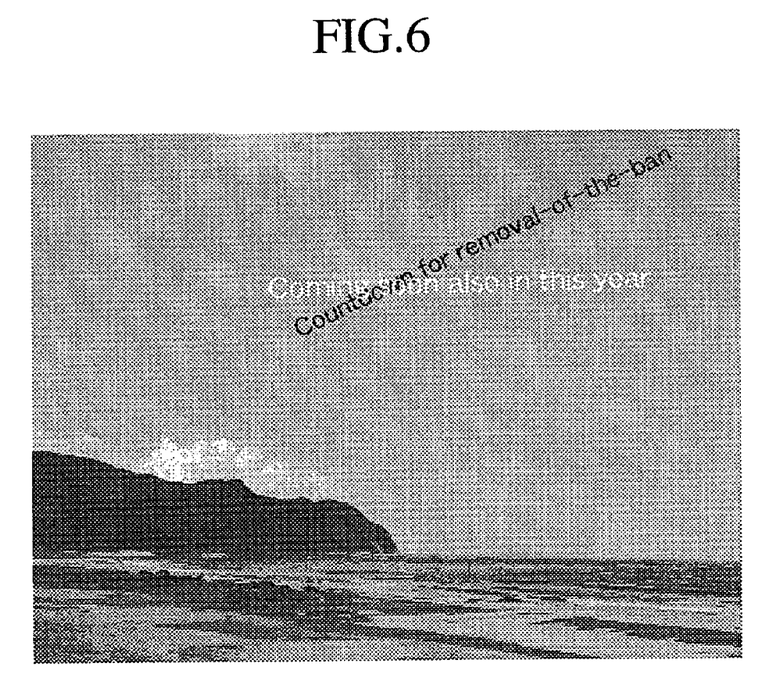
FIG. 6 is a diagram showing an example of a second frame of the image outputted by an image output means of the image superimposing apparatus in accordance with embodiment 1 of the present invention.

The image output means 18 then outputs the second frame of the image in which the first and second images to be superimposed are superimposed on the second frame of the background image by the superimposing processing means 17. FIG. 6 is a diagram showing an example of the second frame of the image outputted by the image output means 18. In this example, the newly-added image to be superimposed which is to be displayed for the first time, such as "Countdown for removal-of-the-ban", is displayed in the upper central block which is determined to be the deepest part of the second frame of the background image which is a scenery photograph including the photo-shot sky and sea in a certain size, a certain inclination, a certain color, a certain blur level, and a certain transparency which are specified by the superimposing determining means, and the first image to be superimposed which is to be displayed for the second time, such as "Coming soon also in this year", is displayed at the specified display position of the second frame of the background image in a certain size, a certain inclination, a certain color, a certain blur level, and a certain transparency which are specified by the superimposing determining means.

Thus, the superimposing determining means 16 acquires a background image inputted by the background image input means 11, a series of images to be superimposed inputted one by one by the superimposing image input means 12, and determines a superimposing method of superimposing each of the series of images to be superimposed acquired one by one on the background image at which position of the background image, in what size, in what inclination, in what color, in what blur level, and in what transparency, on a frame-by-frame basis, and the superimposing processing means 17 acquires the background image inputted by the background image input means 11 and the series of images to be superimposed inputted one by one by the superimposing image input means 12, and superimposes each of the series of images to be superimposed on the background image on a frame-by-frame basis using the superimposing method determined by the superimposing determining means 16. The image output means 18 then outputs an image in which the series of images to be superimposed are superimposed on the background image by the superimposing processing means 17 on a frame-by-frame basis.

Figure 7:
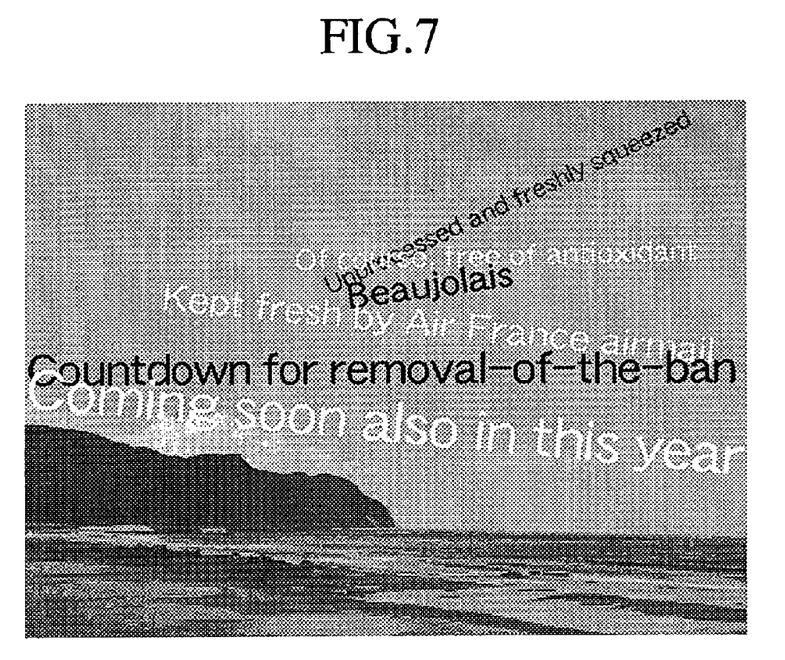
FIG. 7 is a diagram showing an example of a sixth frame of the image outputted by an image output means of the image superimposing apparatus in accordance with embodiment 1 of the present invention.

FIG. 7 is a diagram showing an example of a sixth frame of the image outputted by the image output means 18. In the background image which is a scenery photograph including the photo-shot sky and sea, the first display of a sixth image to be superimposed of "Unprocessed and freshly squeezed" is made in the upper central block which is determined to be the deepest part of a sixth frame of the background image, a second display of a fifth image to be superimposed of "Of course, free of antioxidant" is made at a predetermined position specific for the second display, a third display of a fourth image to be superimposed of "Beaujolais" is made at a predetermined position specific for the third display, a fourth display of a third image to be superimposed of "Kept fresh by Air France airmail" is made at a predetermined position specific for the fourth display, a fifth display of the second image to be superimposed of "Countdown for removal-of-the-ban" is made at a predetermined position specific for the fifth display, and a sixth display of the first image to be superimposed of "Coming soon also in this year" is made at a predetermined position specific for the sixth display, in their respective sizes, inclinations, colors, blur levels, and transparencies which are specified for the first through sixth images to be superimposed. At this time, each of the series of images to be superimposed is displayed such that as the number of times that each of the series of images to be superimposed is displayed increases, the size of each of the series of images to be superimposed increases.

Thus, by sequentially displaying the plurality of images to be superimposed inputted one by one, e.g., a series of short sentences, such as "Coming soon also in this year", "Countdown for removal-of-the-ban", "Kept fresh by Air France airmail", "Beaujolais", "Of course, free of antioxidant", and "Unprocessed and freshly squeezed", at specified positions starting from a display start position corresponding to the deepest part of the background image, and ending at a display end position, each of the plurality of images to be superimposed can be displayed while being made to move toward the viewer and to rotate rightward or leftward from the display start position to the display end position on the background image.

Figure 8:
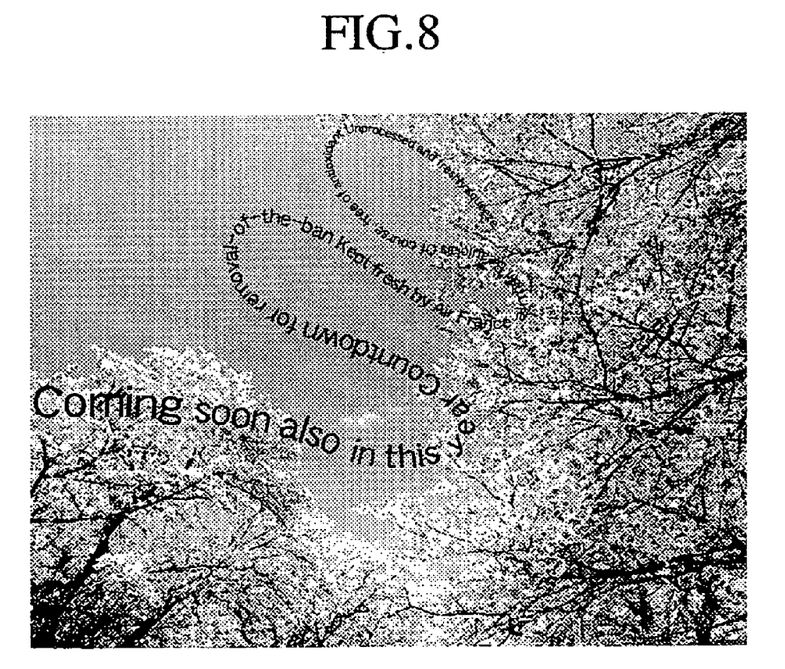
FIG. 8 is a diagram showing an example of the image outputted by the image output means of the image superimposing apparatus in accordance with embodiment 1 of the present invention.

FIG. 8 is a diagram showing another example of the image outputted by the image output means 18. In this example, each of the plurality of images to be superimposed which are the same as those shown in FIG. 7 can be displayed in the background image which is a scenery photograph including the photo-shot sky and cherry trees while being made to move toward the viewer in a zigzag direction and in the form of a belt from the display start position to the display end position on the background image.

The superimposing determining means 16 can detect the outline or boundary of each of objects which are included in the background image using a wavelet transformation, color temperature, or the like of the background image, and can also detect the hierarchical structure of the objects contained in the background image. As a result, the superimposing determining means 16 can display the series of images to be superimposed so that they jump out of the back of an object in the hierarchical structure which is determined to be located the deepest in the background image by defining, as the display start position at which the display of each image to be superimposed is started, a position corresponding to the back of the object in the hierarchical structure which is determined to be located the deepest in the background image, instead of the deepest part of the background image.

When the background image is a moving image, the superimposing determining means 16 can determine a series of display positions at which each of the series of images to be superimposed is to be sequentially displayed based on movements of a moving object which is contained in the background image. For example, when the background image is a moving image in which a person is moving in woods, the superimposing determining means 16 can display a series of images to be superimposed so that they are running from behind a tree which is located the deepest in the background image toward the viewer while appearing and disappearing because of other trees.

When acquiring viewer position information from a sensor for detecting the position of the viewer who is viewing and listening to the series of images to be superimposed with respect to the display screen by way of the parameter input means 13, the superimposing determining means 16 determines that a series of display positions at which each of the images to be superimposed is to be sequentially displayed are running along the direction of the depth of the background image from the deepest part of the background image towards the viewer so that the series of images to be superimposed can run toward the viewer's face.

As mentioned above, according to this embodiment 1, the deepest part determining means 15 determines the deepest part of a background image, the superimposing determining means 16 determines a superimposing method of superimposing each of a series of images to be superimposed on the background image at which position of the background image, in what size, in what inclination, in what color, in what blur level, and in what transparency, the superimposing method being dependent upon for which time each of the series of images to be superimposed is to be displayed, and the superimposing processing means 17 superimposes the series of images to be superimposed on the background image on a frame-by-frame basis using the superimposing method determined by the superimposing determining means 16. Therefore, this embodiment offers an advantage of being able to display the series of images to be superimposed so that they are running in the direction of the depth of the background image.

According to this embodiment 1, by determining the deepest part of the background image on a frame-by-frame basis using the deepest part determining means, when the background image is, for example, a moving image obtained by capturing a scene which was seen from the windshield of a vehicle traveling a mountain road, the image superimposing apparatus can create a display of a series of images to be superimposed so that they are sequentially running from the other side of a curve in the mountain road.

Furthermore, according to this embodiment 1, the deepest part determining means 15 exactly determines the deepest part of the background image which varies dependently upon the contents of the background image by selecting one of a candidate for the deepest part of the background image which is searched by the deepest part searching means 14, and predetermined candidates for the deepest part of the background image, according to a probability preset to the searched candidate for the deepest part of the background image, and probabilities respectively preset to the predetermined candidates for the deepest part of the background image, those probabilities being predetermined dependently upon a predetermined parameter, such as the season in which the background image was created, and the superimposing determining means 16 then determines the deepest part of the determined background image as the display start position at which the display of each of the series of images to be superimposed is started. Therefore, the present embodiment offers an advantage of being able to provide the series of images to be superimposed for the viewer more effectively.

In addition, according to this embodiment 1, the superimposing determining means 16 acquires the viewer position information about the position of the viewer by way of the parameter input means 13, and determines the series of display positions at which each of the series of images to be superimposed is sequentially displayed such that they are running along the direction of the depth of the background image from the deepest part of the background image towards the viewer, so that the series of images to be superimposed can run toward the viewer's face. Therefore, the present embodiment offers a further advantage of being able to implement an interactive video display system which can change the way that the series of images to be superimposed are running according to movements of the viewer in front of a large-screen display.

There can be installed an information display system which uses the "image superimposing apparatus" according to the present invention in a station, a financial institution, and a commercial facility for advertisements, for example. In this case, the pulling power of ads can be improved. Conventionally, only a flow of a two-dimensional image to be superimposed is created in the longitudinal direction or longitudinal direction of the background image. In contrast, the image superimposing apparatus according to this embodiment can create a flow of a series of three-dimensional images to be superimposed in the direction of the depth of the background image, and can therefore provide an impact-filled image for the viewer. As a result, the image superimposing apparatus can make the created image more appealing to the viewer.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image superimposing apparatus comprising:
   an image-to-be-superimposed input means for inputting an image to be superimposed;
   a background image input means for inputting a background image which is used as a background against which the image to be superimposed is to be displayed;
   a display form input means for inputting a display form of the image to be superimposed;
   a display start position setting means for setting a display start position at which a display of the image to be superimposed on said background image is started; and
   a superimposing processing means for acquiring the image to be superimposed inputted by said superimposing image input means, the background image inputted by said background image input means, and the display form inputted by said display form input means, and for starting a display of said image to be superimposed from the display start position set by said display start position setting means, wherein said display start position corresponds to a deepest part of the background image which can be assumed to be located deepest with respect to a direction of a depth of the background image and wherein said superimposing processing means displays a flow of said image to be superimposed in said direction of the depth of the background image.

2. An image superimposing apparatus comprising:
   an image-to-be-superimposed input means for inputting a series of images to be superimposed, such as character strings or figures for explanation;
   a background image input means for inputting a background image which is used as a background against which the series of images to be superimposed are to be displayed;
   a parameter input means for inputting display information required for a display of each of the series of images to be superimposed, the display information being dependent upon for which time each of the series of images to be superimposed is to be displayed;
   a deepest part searching means for dividing each frame of the background image inputted by said background image input means into a plurality of blocks, and for searching for a candidate for a deepest part of the background image which can be assumed to be located deepest with respect to a direction of a depth of the background image based on a color distribution or brightness of each of the plurality of blocks;
   a deepest part determining means for selecting one of the candidate for the deepest part of the background image which is searched by said deepest part searching means, and predetermined candidates for the deepest part of the background image, according to a probability preset to the searched candidate for the deepest part of the background image, and probabilities respectively preset to the predetermined candidates for the deepest part of the background image, those probabilities being predetermined dependently upon a certain parameter indicating contents of the background image, so as to determine the deepest part of the background image;
   a superimposing determining means for acquiring the background image inputted by said background image input means, the series of images to be superimposed inputted by said superimposing image input means, the display information required for the display of each of the series of images to be superimposed, which is inputted by said parameter input means, and information about the deepest part of the background image determined by said deepest part determining means, and for determining a superimposing method of superimposing each of the series of images to be superimposed on the background image, the superimposing method being dependent upon for which time each of the series of images to be superimposed is to be displayed; and
   a superimposing processing means for acquiring the background image inputted by said background image input means, and the series of images to be superimposed inputted by said superimposing image input means, and for superimposing the series of images to be superimposed on the background image on a frame-by-frame basis according to the superimposing method of superimposing each of the series of images to be superimposed on the background image, which is determined by said superimposing determining means.

3. The image superimposing apparatus according to claim 2, wherein said deepest part searching means checks the color distribution of each of the plurality of divided blocks, and, when determining that a number of blue-colored blocks included in the plurality of blocks in each frame of the background image is equal to or larger than a predetermined number, selects, as the candidate for the deepest part of the background image, a central or upper central one of the blue-colored blocks.

4. The image superimposing apparatus according to claim 2, wherein said deepest part searching means checks the brightness of each of the plurality of divided blocks, and, when determining that the background image can be divided into a bright upper portion and a dark lower portion, selects, as the candidate for the deepest part of the background image, an upper central one of the plurality of blocks.

5. The image superimposing apparatus according to claim 2, wherein said deepest part searching means checks the brightness of each of the plurality of divided blocks, and, when determining that the background image is dark as a whole, and a block of high brightness is included in the plurality of divided blocks, selects, as the candidate for the deepest part of the background image, the block of high brightness.

6. The image superimposing apparatus according to claim 2, wherein said deepest part determining means uses a season in which the background image was created as the predetermined parameter.

7. The image superimposing apparatus according to claim 2, wherein said deepest part determining means uses a type of fashion as the predetermined parameter.

8. The image superimposing apparatus according to claim 2, wherein said superimposing determining means determines, as a display start position at which the display of each of the series of images to be superimposed is started, the deepest part of the background image determined by said deepest part determining means.

9. The image superimposing apparatus according to claim 2, wherein said superimposing determining means detects a hierarchic structure of objects contained in the background image, and determines, as a display start position at which the display of each of the series of images to be superimposed is started, a position corresponding to a back of an object which is located deepest in the hierarchic structure of the objects contained in the background image.

10. The image superimposing apparatus according to claim 2, wherein said superimposing determining means acquires the display information required for the display of each of the series of images to be superimposed, such as position information, size information, inclination information, color information, focus information, and transparency information, which is inputted by the parameter input means, and determines a superimposing method of superimposing each of the series of images to be superimposed on the background image at which position of the background image, in what size, in what inclination, in what color, with how each of the series of images to be superimposed gets blurred, and in what transparency.

11. The image superimposing apparatus according to claim 2, wherein said superimposing determining means determines the superimposing of each of the series of images to be superimposed so that each of the series of images to be superimposed has a size that becomes large gradually while moving from a display start position at which the display of each of the series of images to be superimposed is started to a display end position at which the display of each of the series of images to be superimposed is ended.

12. The image superimposing apparatus according to claim 2, wherein said superimposing determining means determines the superimposing of each of the series of images to be superimposed so that each of the series of images to be superimposed doesn't have a same color as the background image on which each of the series of images to be superimposed is superimposed.

13. The image superimposing apparatus according to claim 2, wherein said superimposing determining means acquires information about a detected position of a viewer who is viewing and listening to the series of images to be superimposed from said parameter input means, and determines that a series of display positions at which each of the series of images to be superimposed is to be sequentially displayed are running from the deepest part of the background image along the direction of the depth of the background image.

14. The image superimposing apparatus according to claim 2, wherein said superimposing determining means determines a series of display positions at which each of the series of images to be superimposed is to be sequentially displayed based on movements of an object contained in the background image.

15. The image superimposing apparatus according to claim 2, wherein each of the series of images to be superimposed is a short sentence, and said superimposing determining means determines the superimposing of each of the series of images to be superimposed so that they are separately displayed.

16. The image superimposing apparatus according to claim 2, wherein said superimposing determining means determines the superimposing of each of the series of images to be superimposed so that each of them moves in a zigzag direction and in a form of a belt from a display start position at which the display of each of the series of images to be superimposed is started to a display end position at which the display of each of the series of images to be superimposed is ended.

17. An image superimposing method comprising:
inputting an image to be superimposed;
inputting a background image which is used as a background against which the image to be superimposed is to be displayed;

inputting a display form of the image to be superimposed;
setting, by utilizing a display start position setting means, a display start position at which a display of the image to be superimposed on said background image is started;
acquiring the inputted image to be superimposed, the inputted background image, and the inputted display form, and for starting a display of said image to be superimposed from the display start position set by said display start position setting means, wherein said display start position corresponds to a deepest part of the background image which can be assumed to be located deepest with respect to a direction of a depth of the background image and displaying a flow of said image to be superimposed in said direction of the depth of the background image.

18. An image superimposing method comprising:
inputting a series of images to be superimposed, such as character strings or figures for explanation;
inputting, by utilizing a background image input means, a background image which is used as a background against which the series of images to be superimposed are to be displayed;
inputting display information required for a display of each of the series of images to be superimposed, the display information being dependent upon for which time each of the series of images to be superimposed is to be displayed;
dividing each frame of the background image inputted by said background image input means into a plurality of blocks, and for searching for a candidate for a deepest part of the background image which can be assumed to be located deepest with respect to a direction of a depth of the background image based on a color distribution or brightness of each of the plurality of blocks;
selecting one of the candidate for the deepest part of the background image, and predetermined candidates for the deepest part of the background image, according to a probability preset to the searched candidate for the deepest part of the background image, and probabilities respectively preset to the predetermined candidates for the deepest part of the background image, those probabilities being predetermined dependently upon a certain parameter indicating contents of the background image, so as to determine the deepest part of the background image;
acquiring the background image inputted by said background image input means, the inputted series of images to be superimposed, the display information required for the display of each of the series of images to be superimposed, and information about the deepest part of the background image, and for determining a superimposing method of superimposing each of the series of images to be superimposed on the background image, the superimposing method being dependent upon for which time each of the series of images to be superimposed is to be displayed; and
acquiring the background image inputted by said background image input means, and the inputted series of images to be superimposed, and for superimposing the series of images to be superimposed on the background image on a frame-by-frame basis according to the superimposing method of superimposing each of the series of images to be superimposed on the background image.

* * * * *